United States Patent Office 3,307,910
Patented Mar. 7, 1967

3,307,910
PROCESS FOR STABILIZING AQUEOUS SOLUTIONS OF HYDROGEN PEROXIDE
André Ryckaert, Uccle, Brussels, Belgium, and Charles Domen, deceased, late of Etterbeek, Brussels, Belgium, by Lucie Jeanne Henriette Domen nee Depauw, heir, Brussels, Belgium, assignors to Solvay & Cie, Brussels, Belgium, a company of Belgium
No Drawing. Filed Feb. 25, 1964, Ser. No. 347,310
Claims priority, application Belgium, Mar. 4, 1963, 503,441
6 Claims. (Cl. 23—207.5)

The present invention concerns a process of stabilizing aqueous solutions of hydrogen peroxide.

It is known that aqueous solutions of hydrogen peroxide of strict purity are very stable at room temperature; their stability increases with concentration; on the other hand it decreases rapidly if the temperature of the solution is raised or if it is rendered alkaline by adjusting the pH value above 5. The presence in this aqueous hydrogen peroxide solutions, of certain metallic ions considerably reduces their stability; the same applies to certain organic substances. Furthermore, contact with certain metals likewise brings about more or less decomposition.

It is, therefore, suitable to make aqueous hydrogen peroxide solutions as pure as possible and to free them from metallic ions which have become dissolved in the course of manufacture.

In spite of these precautions it is of practice to introduce into commercial hydrogen peroxide solutions, small amounts of one or more additives, organic or inorganic, which act as stabilizers during storage, transport or use of these solutions.

Among the inorganic stabilizers, sodium stannate is one of the most frequently used by reason of its effectiveness under the most diverse conditions. Nevertheless, its presence during certain chemical reactions modifies the character of the product obtained: for example, it acts unfavourably on the colour of epoxide products resulting from the action of hydrogen peroxide.

It is, therefore, advantageous to provide hydrogen peroxide solutions stabilized partly or completely by organic stabilizers, in asmuch as, the latter do not react with the hydrogen peroxide.

The present invention concerns a new class of stabilizers for aqueous hydrogen peroxide solutions which, used alone or in combination with other stabilizers, lead to surprising results.

According to the invention aqueous hydrogen peroxide solutions of any concentration found commercially, that is to say 3 to 90% by weight, are stabilized by adding minor amounts of an acid of the formula:

$$HOOC-CH_2-Y-CH_2-COOH$$

in which Y represents oxygen or sulphur.

Not only are the acids soluble in water and in very concentrated solutions of hydrogen peroxide but they also resist the oxidising action of the hydrogen peroxide.

Commercially hydrogen peroxide is, therefore, treated with a sufficient proportion of the specified type of acid to obtain the desired degree of stability. The amount of acid to be added depends on several factors, such as the quality and the initial concentration of the hydrogen peroxide solutions to be stabilized, the desired degree of stability and the purpose to which the product is to be put.

The acids of the specified type are excellent stabilizers when used alone. They can nevertheless be used in mixtures or even combined with other well known stabilizers for hydrogen peroxide such as phosphoric acid or phosphates soluble in water. They can also be applied in the form of their water soluble salts.

To determine rapidly the quality of the aqueous solutions of hydrogen peroxide, the commercial specifications provide that the determination of stability of these solutions is effected at 100° C. The technique adopted in the experiments described in the following table consists in measuring, at the given temperature and under known pressure conditions, the volume of oxygen released. From these factors, the quantity of hydrogen peroxide decomposed is calculated on the basis of the reaction:

$$H_2O_2 \rightarrow H_2O + \tfrac{1}{2}O_2$$

The results are expressed in grams of hydrogen peroxide decomposed per kilogram of hydrogen peroxide and per hour at 100° C.

The concentrations of hydrogen peroxide in the starting solutions are expressed in percent by weight.

For all the experiments, the vessels containing the samples were new "Pyrex" glass vessels, passivated by treatment with analytically pure fuming nitric, acid, then rinsed several times with bidistilled water and finally dried in a desiccator.

| Stabilizers Nature | Amount used; in mg./kg. 110% $H_2O_2$ | Decomposition in g. $H_2O_2$ decomposed/kg. 100% $H_2O_2$/h. at 100° C., for solutions of $H_2O_2$ at— | | |
|---|---|---|---|---|
| | | 10% | 35% | 70% |
| | 0 | >200 | >200 | 93 |
| Diglycolic acid | 100 | 26 | 12 | 8 |
| | 330 | 14 | 6 | 6 |
| | 660 | 15 | 7 | 7 |
| | 1,200 | 16 | 7 | 8 |
| Thiodiglycolic acid | 100 | | 37 | |
| | 330 | | 27 | 40 |
| | 660 | 71 | 25 | |

Consideration of this table permits the selection of the acid concentration best suited for stabilizing a particular aqueous hydrogen peroxide solution of determined quality.

The stabilizing effect is already appreciable at a concentration of diglycolic or thiodiglycolic acid of 0.05 g./kg. 100% $H_2O_2$. On the other hand the use of concentrations greater than 1.5 g./kg. 100% $H_2O_2$ does not appear to be recommended. The most usual concentration lies between 0.2 and 0.6 g./kg. 100% $H_2O_2$.

We claim:
1. Process for stabilizing aqueous hydrogen peroxide solutions characterized by adding thereto minor amounts of an acid of the formula

$$HOOC-CH_2-Y-CH_2-COOH$$

in which Y represents oxygen or sulphur.
2. Process according to claim 1 characterized in that the stabilizer is diglycolic acid.
3. Process according to claim 1 characterized in that the stabilizer is thiodiglycolic acid.

4. A composition of matter comprising an aqueous solution of hydrogen peroxide and an acid selected from the group consisting of diglycolic acid and thiodiglycolic acid in an amount sufficient to stabilize said solution.

5. A composition of matter according to claim 4, in which the quantity of the acid is 0.015 to 1.5 grams per kilogram of 100% hydrogen peroxide.

6. A composition of matter according to claim 5, in which the quantity of the acid is 0.2 to 0.6 gram per kilogram of 100% hydrogen peroxide.

References Cited by the Examiner

UNITED STATES PATENTS 3,194,768   7/1965   Lindner et al. _____ 23—207.5

OTHER REFERENCES

Schumb et al.: "Hydrogen Peroxide," Reinhold Publishing Corporation, New York, N.Y., 1955, page 294.

MILTON WEISSMAN, *Primary Examiner.*

H. S. MILLER, *Assistant Examiner.*